United States Patent
Young

[11] 3,844,293
[45] Oct. 29, 1974

[54] CORN SHELLER DEVICE
[76] Inventor: Donald M. Young, Winterset, Iowa
[22] Filed: Mar. 22, 1973
[21] Appl. No.: 344,165

[52] U.S. Cl. .................................. 130/6
[51] Int. Cl. ............................. A01f 11/06
[58] Field of Search ...................... 130/6, 8

[56] References Cited
UNITED STATES PATENTS

| | | | |
|---|---|---|---|
| 583,542 | 6/1897 | Nelson | 130/8 |
| 2,325,654 | 8/1943 | Borchers | 130/6 |
| 2,382,040 | 8/1945 | Erickson | 130/6 |
| 2,842,139 | 7/1958 | Carlson | 130/6 |

*Primary Examiner*—Antonio F. Guida
*Attorney, Agent, or Firm*—Zarley, McKee, Thomte & Voorhees

[57] ABSTRACT

A corn sheller device comprising a truncated cone-shaped housing disposed in an inclined manner and having a cone-shaped drum rotatably mounted therein. The inside surface of the housing has a resilient thread means secured thereto and extending therearound which protrudes towards the drum. The exterior surface of the drum has a resilient thread means secured thereto and extending therearound which protrudes towards the inside surface of the housing. The drum is mounted on a rotatable and longitudinally adjustable shaft which is driven by a suitable power means to cause the rotation of the drum with respect to the housing. At least a portion of the housing is perforated to permit the kernels of the corn to drop downwardly therethrough. The ears are fed to the upper open end of the housing and pass between the inside surface of the housing and the exterior surface of the rotating drum. The resilient threads of the housing and the drum cooperate to shell the kernels from the ear without damaging the kernels.

8 Claims, 3 Drawing Figures

PATENTED OCT 29 1974 3,844,293

CORN SHELLER DEVICE

BACKGROUND OF THE INVENTION

Conventional corn shelling devices are less than satisfactory since excessive kernel damage is experienced. A large majority of the conventional corn shelling devices comprise a rotating metal cylinder which rotates in close proximity to a metal concave or the like. The metal components of the cylinder and concave cause the kernels to be cracked which results in financial loss to the farmer.

Therefore, it is a principal object of the invention to provide an improved corn sheller device.

A further object of the invention is to provide a corn shelling device which substantially reduces kernel damage.

A further object of the invention is to provide a corn shelling device which may be used as an separate apparatus or which may be used in a combine or the like.

A further object of the invention is to provide a corn shelling device having resilient means therein for shelling the corn without damaging the kernels.

A further object of the invention is to provide a corn sheller device having means for adjusting the clearance between a rotatable drum and a stationary housing.

A further object of the invention is to provide a corn sheller device which is economical of manufacture and durable is use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENT

Figure 1:
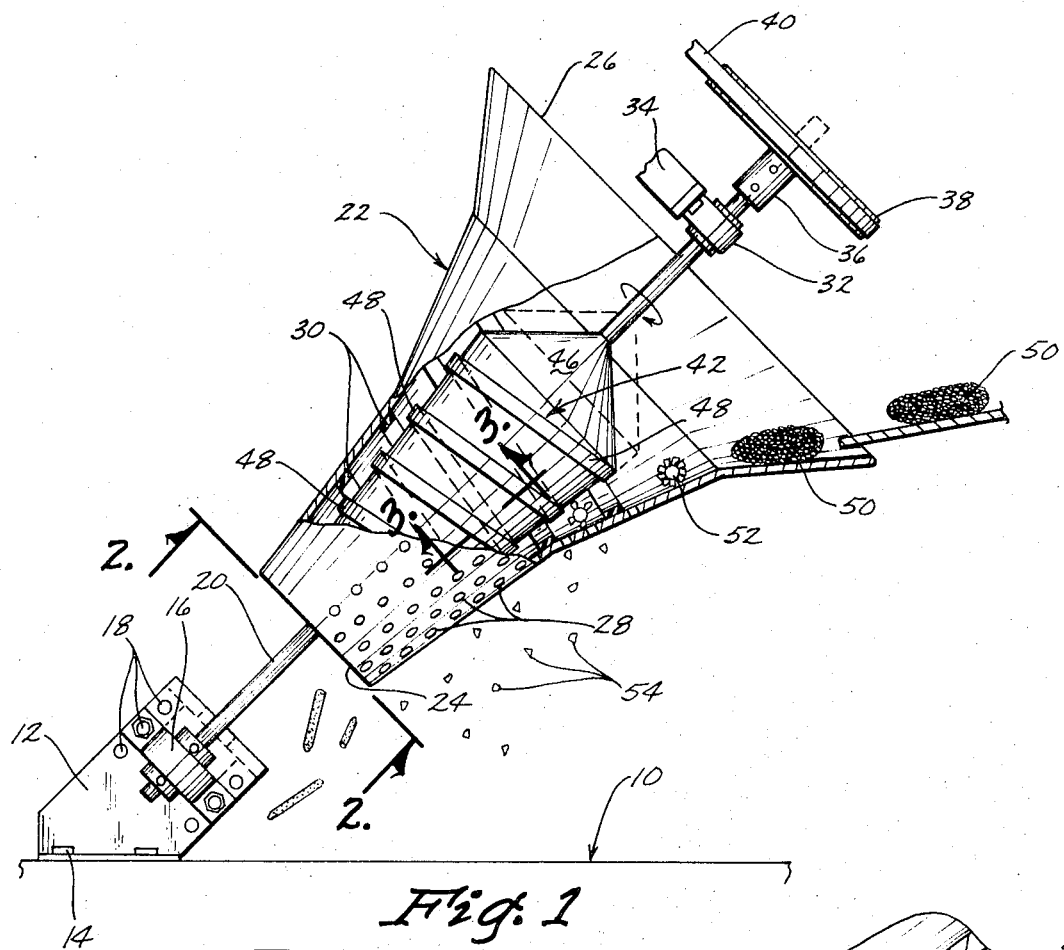
FIG. 1 is a side view of the device of this invention with portions thereof cut-away to more fully illustrate the invention.

In FIG. 1, the numeral 10 refers generally to a supporting surface such as a floor structure if the device is to be used as an individual component or to a suitable supporting surface in a combine or the like if the apparatus is being used in the combine. Bracket 12 is secured to the supporting surface 10 by bolts 14. A lower bearing 16 is adjustably mounted on the bracket 12 by means of the three sets of holes 18.

Figure 2:
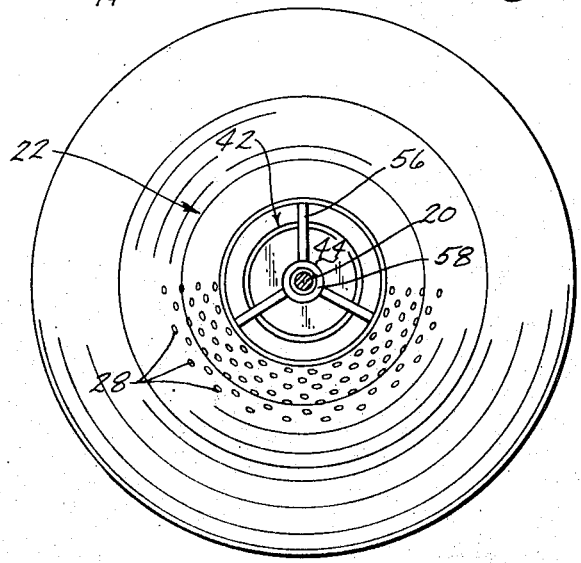
FIG. 2 is a sectional view seen along lines 2 — 2 of FIG. 1.
Figure 3:
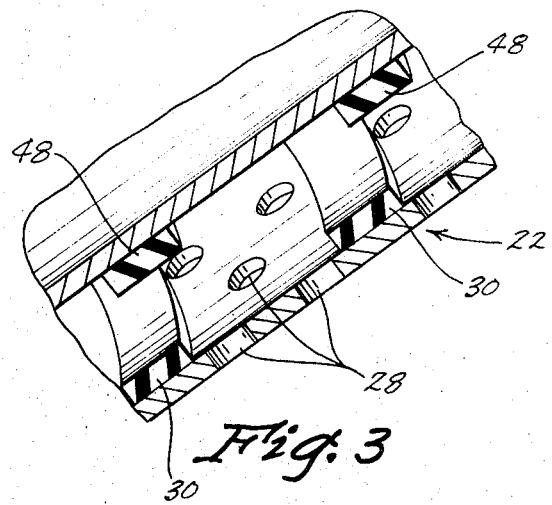
FIG. 3 is an enlarged sectional view as seen along line 3 — 3 of FIG. 1.

The numeral 20 refers to a shaft which is rotatably mounted in the lower bearing 16 and which extends upwardly as seen in FIG. 1. The shaft 20 extends upwardly through a truncated cone-shaped housing generally referred to by the reference numeral 22. The housing 22 is stationary and would be secured to the supporting surface 10 or other support means to maintain it in its stationary position. Housing 22 has an open lower end 24 and an open upper end 26. The housing 24 is provided with a plurality of perforations 28 along its underside as also seen in FIGS. 1 and 2. Housing 22 is provided with a resilient thread means 30 which is secured to its interior surface and which extends therearound in a spiral or thread-like manner. As seen in the drawings, thread means 30 protrudes from the inner wall surface of the housing 22.

Shaft 20 rotatably and slidably extends through an upper bearing 32 which is mounted in a brace 34 which is secured to a suitable support means. The upper end of the shaft 20 is slidably received by a hub 36 secured to a pulley 38. Pulley 38 is operatively connected to a suitable power means by means of belt 40.

A cone-shaped drum 42 is mounted on shaft 20 within housing 22 for rotation with the shaft. Drum 42 has a closed lower end 44 and a closed upper end 46 which tapers outwardly from the shaft 20 as viewed in FIG. 1. A resilient thread means 48 is secured to the exterior surface of drum 42 and extends therearound in a spiral or thread-like manner as seen in FIG. 1. The thread means 48 protrudes from the exterior surface of the drum 42 towards the housing 22. The housing 22 and the drum 42 are constructed of a metal material while the resilient thread means 30 and 48 are constructed of a suitable resilient material such as rubber, neoprene or the like. For purposes of description, the corn ears will be referred to by the reference numeral 50 comprising cobs 52 and kernels 54.

The normal method of operation is as follows. The shaft 20 would be rotated by the power means which causes the rotation of the drum 42 with respect to the housing 22. As seen in FIG 2, the lower end of housing 22 has a plurality of spoke members 56 secured thereto which extend inwardly towards the shaft. A hub 58 is secured to the inner end of the spoke members 56 and rotatably embraces the shaft 20 to maintain the lower end of the housing 22 in a spaced relationship with respect to the drum. The corn ears 50 are fed to the open upper end of the housing 22 in the manner illustrated in FIG. 1. The ears fall downwardly into the area between the drum 42 and the housing 22 as seen in FIG. 1 and are engaged by the drum and the resilient thread means 48. The ears are passed between the resilient thread means 30 and 48 which apply resilient compressive force to the ears so as to dislodge the kernels 54 from the cobs 52. The kernels 54 pass from the housing 22 by means of the perforations 28 while the cobs 52 are discharged from the lower end of the housing 22.

The resilient compressive forces applied to the ears by the resilient threads removes the kernels from the cobs without cracking or otherwise damaging the kernels as is the case in conventional corn sheller devices. The drum 42 may be longitudinally adjusted with respect to the housing 22 by means of raising or lowering the bearing 16 relative to the bracket 12 so that the clearance between the drum 42 and the housing 22 may be selectively varied. Thus it can be seen that an improved corn sheller device has been provided which accomplishes at least all of its stated objectives.

I claim:

1. A corn shelling device comprising,
    a truncated cone-shaped housing having open upper and lower ends and an inside wall surface,
    said housing being perforated for at least a portion of its length,
    a cone-shaped drum means rotatably mounted in said housing and having a peripheral wall surface spaced from the inside wall surface of said housing, power means for rotating said drum means with respect to said housing, a first resilient spiral thread means secured to said inside wall surface of said housing and extending therearound, said first thread means protruding towards said drum means, a second resilient spiral thread means secured to the wall surface of said drum and extending therearound, said second thread means protruding towards said inside wall surface of said housing.

2. The device of claim 1 wherein said first and second thread means are spaced apart.

3. The device of claim 1 wherein said drum means is longitudinally adjustably mounted in said housing to permit the spacing between said drum means and housing to be varied.

4. The device of claim 1 wherein said housing and drum means are disposed in an inclined relationship.

5. The device of claim 4 wherein a bracket means is secured to a supporting surface, a first bearing means secured to said bracket, a shaft means having a lower end rotatably mounted in said first bearing means, said drum means being secured to said shaft means for rotation therewith, means for rotatably supporting said shaft means adjacent the upper end thereof, said power means being operatively secured to said shaft means.

6. The device of claim 5 wherein said means for rotatably supporting said shaft means adjacent the upper end thereof comprises a support means secured to a supporting surface, a second bearing means on said support means, said shaft means being rotatably and slidably mounted in said second bearing means, said first bearing means being adjustably secured to said bracket means.

7. The device of claim 1 wherein said drum means has a closed upper end.

8. The device of claim 7 wherein said closed upper end is tapered.

* * * * *